UNITED STATES PATENT OFFICE.

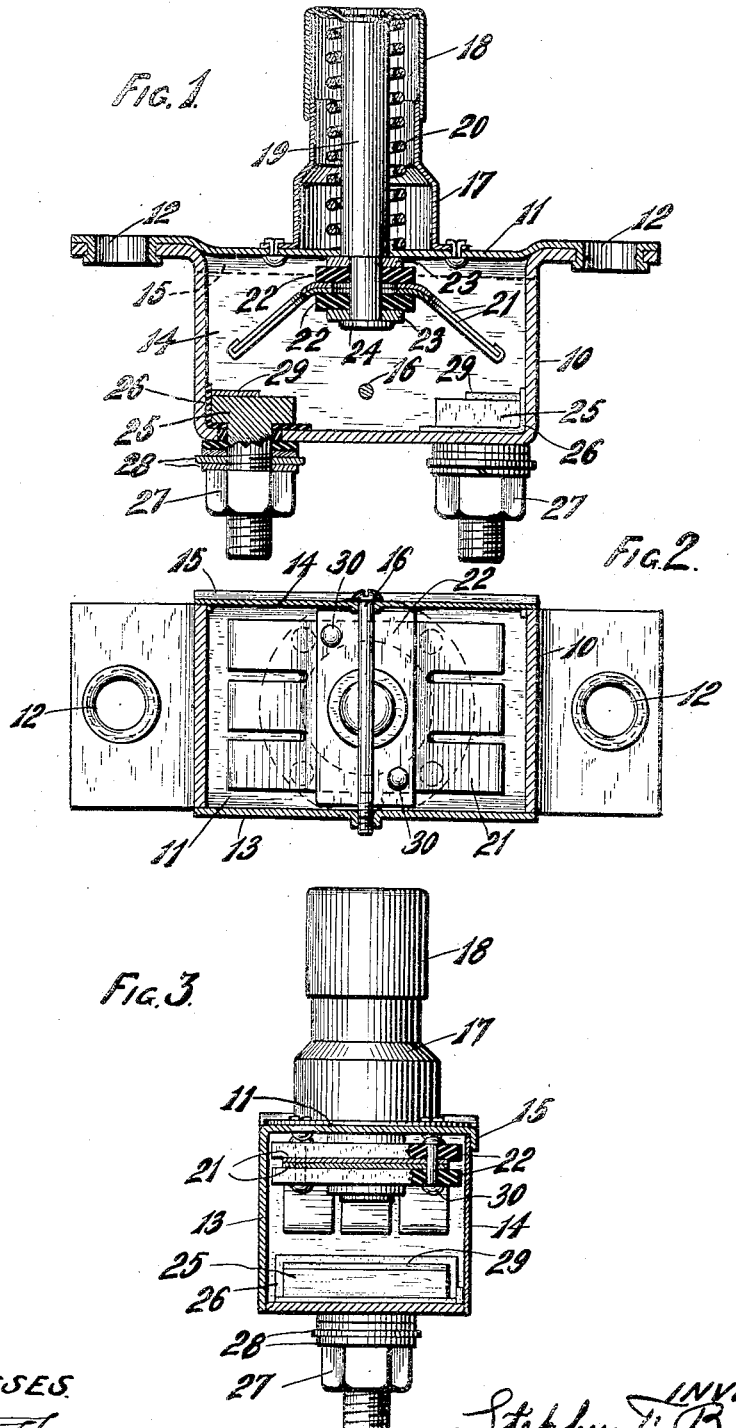

STEPHEN F. BRIGGS AND EDWARD N. JACOBI, OF MILWAUKEE, WISCONSIN, ASSIGNORS TO BRIGGS & STRATTON COMPANY, OF MILWAUKEE, WISCONSIN, A CORPORATION OF WISCONSIN.

PEDAL-SWITCH.

1,336,066.       Specification of Letters Patent.     Patented Apr. 6, 1920.

Application filed February 10, 1917. Serial No. 147,913.

*To all whom it may concern:*

Be it known that we, STEPHEN F. BRIGGS and EDWARD N. JACOBI, citizens of the United States, and residents of Milwaukee, in the county of Milwaukee and State of Wisconsin, have invented new and useful Improvements in Pedal-Switches, of which the following is a description, reference being had to the accompanying drawings, which are a part of this specification.

This invention relates to pedal switches such as are used for controlling starting motors for automobile engines, and has for its object to provide a simple structure which will be strong and durable though inexpensive to manufacture.

With the above and other objects in view the invention consists in the pedal switch as herein claimed and all equivalents.

Referring to the accompanying drawings, in which like characters of reference indicate the same parts in different views:

Figure 1 is a central sectional view of a pedal switch constructed in accordance with this invention;

Fig. 2 is a sectional plan view of the switch inverted; and,

Fig. 3 is a transverse sectional view thereof.

In these drawings 10 indicates a yoke forming the back and ends of the casing as well as the attaching ears. This yoke is formed of a narrow strip of comparatively heavy sheet metal bent along transverse lines to form the box-like casing or frame with its ends bent outwardly to constitute attaching ears at the front or top of the casing.

A top plate 11, also of sheet metal extends across the top of the casing and is secured to the attaching ears thereof, preferably by having portions forced through the screw holes 12 in said ears as if they were tubular rivets. The sheet metal which forms the top plate 11 is of sufficient width to form the back 13 of the casing, which is bent down therefrom and fits against the edges of the metal strip 10.

Bearing against the opposite edges of the metal strip 10 and completing the case or inclosure is a removable cover plate 14 which fits within a flange 15 bent down from the edge of the cover plate and is held in place by a screw 16 passing therethrough and across the casing and threading into the back 13.

A flanged tubular spring case 17 is fastened to the top plate 11, preferably by means of rivets, and a thimble-shaped cap or button 18 has a telescoping fit thereon with a push rod 19 riveted to it and slidably passing through an opening in the top plate. A coil spring 20 surrounds the push rod and has its ends seated on the top plate and the cap respectively.

Within the casing the push rod is reduced in diameter and has secured thereon a contact spring 21 consisting of a bowed sheet steel spring plate with a copper spring plate therebeneath. The copper contact spring has its ends bent around the ends of the steel contact spring and both have longitudinal slots at their ends shown in Fig. 2 dividing them into a plurality of spring fingers. The spring plates have openings of larger diameter than the reduced portion of the push rod so as to be free from contact therewith and are held in place between insulating strips 22 which in turn are between metal washers 23, all being assembled on the reduced portion of the push rod and held securely in place by the end of said rod being upset to form a rivet head 24. The insulating strips 22 are approximately rectangular in shape and their ends, which preferably have rivets 30 passing through them and the spring plates therebetween, are sufficiently close to the back 13 and the cover plate 14 to form a guide for the plunger formed by the push rod and its attached parts and preventing the turning thereof.

In the bottom end corners of the casing are secured terminal studs 25 with large flat rectangular heads insulated from the walls of the casing by insulating gaskets 26. These studs have their threaded ends passing through openings in the bottom of the casing and insulated therefrom with nuts 27 and washers 28 thereon to form binding posts.

Contact plates 29 are secured on top of the terminal studs 25 as by soldering them thereto and are engaged by the ends of the copper contact spring when the push rod is depressed.

The switch mechanism is adapted to be fastened beneath the floor by attaching screws passing through the openings 12 while the spring case 17 projects through an opening in the floor so that the button 18 will be exposed for operation by pressing the foot thereon. The top plate 11 is preferably depressed between the attaching means as shown to permit the flanges of the spring case and their rivets to clear the bottom of the floor.

The depression of the plunger is resisted by the action of spring 20 and causes the contact spring 21 to move downwardly into engagement with the contact plates 29 and then slide along the surface thereof to make an efficient wiping contact for closing the circuit controlled thereby. As soon as the plunger is released, the spring 20 returns it to its normal open position.

The plunger is accurately guided by means of the telescoping fit of the button 18 with the spring case 17 and by means of the push rod fitting within the opening of the top plate while it is prevented from turning by insulating blocks 22 engaging with the side walls of the casing. The spring 20 is well protected within the spring case and all operative parts are confined within the protective housing, access to which may be had by removing the cover plate 14.

The switch of this invention is strong and durable and is efficient for the purposes intended, while being inexpensive to manufacture.

What we claim as new and desire to secure by Letters Patent is:

1. A pedal switch, comprising a frame consisting of a strip of metal bent to form the bottom and end walls of a casing with its ends bent outwardly to constitute attaching ears, a top plate extending from one end of the frame to the other and connected thereto, a front plate and a back plate fitting against the edges of the frame to complete the casing, switch contacts secured to the frame within the casing and a spring pressed plunger switch member slidable through the top plate and adapted to engage the contacts.

2. A pedal switch, comprising a frame consisting of a strip of metal bent to form the bottom and end walls of a casing with its ends bent outwardly to constitute attaching ears, a top plate extending from one end of the frame to the other and connected thereto and having a side extension bent downwardly to constitute the back of the casing, a front plate fitting against the edges of the frame, a screw connecting the front plate to the back plate of the casing, switch contacts secured to the frame within the casing, and a spring pressed plunger switch member slidable through the top plate and adapted to engage the contacts.

3. A pedal switch, comprising a casing, a spring pressed plunger passing through the wall thereof, spring contact fingers carried by the plunger and consisting of arched spring contact plates fitting together and positioned between insulating blocks, means for securing the insulating blocks and the contact plates together, the end of the plunger being reduced and having the insulating blocks mounted thereon and riveted thereto, the ends of the insulating blocks having a bearing engagement with the walls of the casing to prevent the turning of the plunger and switch contacts in the casing engaged by the spring contact fingers.

4. A switch, comprising a casing having integral adjoining walls, a plunger contact mounted therein, a switch contact consisting of a headed bolt passing through one wall of the casing and insulated therefrom and having its head adapted to be engaged by the plunger contact and fitting against another wall of the casing, and insulated therefrom, to prevent the bolt from turning, and a nut threaded on the bolt.

5. A pedal switch, comprising a frame consisting of a strip of metal bent to form the bottom and end walls of a casing with its ends bent outwardly to constitute attaching ears, a top plate extending from one end of the frame to the other and connected thereto, said top plate having a side extension bent downwardly to constitute the back of the casing, a front plate fitting against the edges of the frame and engaging a flange of the top plate, a screw connecting the front plate to the back of the casing, headed studs passing through the frame and forming switch contacts within the casing, nuts threaded on the studs to form binding posts therewith, a tubular spring case having a flange secured to the top plate, a thimble-shaped button telescoping with the spring case, a push rod riveted to the button and passing through the top plate, a spring surrounding the push rod and bearing on the top plate and the button, insulating blocks fitting on a reduced portion of the push rod within the casing, and bowed spring contact plates secured between the insulating blocks and adapted to engage the switch contacts.

6. A pedal switch, comprising a U-shaped frame formed of a strip of metal, a top plate extending from one end of the frame to the other and connected thereto, a spring-pressed plunger passing through the top plate, and insulated headed bolts passing through the bottom of the frame close to the ends of the frame and prevented from turning by the engagement of their heads with the ends of the frame, said bolts forming contacts engaged by the plunger.

7. A pedal switch, comprising a frame formed of a strip of metal bent to a U-shape to form a bottom and end walls of a casing, a top plate extending from one end of the frame to the other and connected thereto, a front plate and a back plate fitting against the edges of the frame to complete the casing, a screw passing through the casing and clamping the front plate and the back plate together, a spring-pressed plunger passing through the top plate, and an insulated contact on the frame engaged by the plunger.

8. A switch, comprising a metal casing, a plunger contact operating therein, a switch contact comprising a headed bolt with its head within the casing and its stem passing through one wall of the casing and insulated therefrom, insulating material between the bolt head and said wall of the casing and between the bolt head and the integral adjoining wall of the casing, said bolt head adapted to be engaged by the plunger contact and having a flat side bearing against the last mentioned wall of the casing with the insulating material therebetween whereby the bolt is prevented from turning, and a nut threaded on the projecting stem of the bolt.

9. In a switch, a casing, a pair of contacts in the casing, a spring actuated plunger passing through a wall of the casing, a plunger contact carried thereby for engaging the pair of contacts and comprising a bowed sheet metal spring, and a similarly shaped flexible sheet metal contact plate in contact therewith and having its ends secured thereto by being bent around the ends of the spring, said bent ends of the contact plate being adapted to engage the pair of contacts.

10. In a switch, a casing, a plunger passing through a wall of the casing, a plunger contact carried by the plunger, a fixed contact engaged thereby, and an insulating block secured on the plunger and having sliding engagement with the wall of the casing to prevent the plunger from turning and to guide the plunger contact into engagement with the fixed contact.

11. In a switch, a casing, a plunger passing through a wall of the casing, a stationary contact in the casing, a plunger contact between a pair of insulating blocks fitting on the end of the plunger and riveted thereto, said insulating blocks engaging the walls of the casing to guide the plunger contact in its movement.

In testimony whereof, we affix our signatures, in presence of two witnesses.

STEPHEN F. BRIGGS,
EDWARD N. JACOBI.

Witnesses:
R. S. C. CALDWELL,
H. D. CHASE.